(12) United States Patent
Saenz et al.

(10) Patent No.: US 10,454,581 B2
(45) Date of Patent: Oct. 22, 2019

(54) SYSTEM AND METHOD FOR PLUG AND PLAY FIBER DISTRIBUTION PANELS

(71) Applicant: Verizon Patent and Licensing Inc., Arlington, VA (US)

(72) Inventors: Jesse C. Saenz, Hurst, TX (US); Dennis Macy, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 49 days.

(21) Appl. No.: 15/720,958

(22) Filed: Sep. 29, 2017

(65) Prior Publication Data

US 2019/0103918 A1  Apr. 4, 2019

(51) Int. Cl.
| | |
|---|---|
| *H04B 10/2575* | (2013.01) |
| *H04B 10/114* | (2013.01) |
| *H04B 10/25* | (2013.01) |
| *G02B 6/44* | (2006.01) |

(52) U.S. Cl.
CPC ..... *H04B 10/25753* (2013.01); *G02B 6/4452* (2013.01); *H04B 10/114* (2013.01); *H04B 10/2504* (2013.01)

(58) Field of Classification Search
CPC .......... H04B 10/25753; H04B 10/2504; H04B 10/114; G02B 6/4452
See application file for complete search history.

(56) References Cited

U.S. PATENT DOCUMENTS

| | | | | |
|---|---|---|---|---|
| 2008/0240730 A1* | 10/2008 | McKelvey | ........... | H04B 10/801 398/168 |
| 2009/0074423 A1* | 3/2009 | Bernard | ................ | H04J 3/0682 398/135 |
| 2015/0349881 A1* | 12/2015 | Byers | ..................... | H04B 10/11 398/38 |
| 2017/0184799 A1* | 6/2017 | Huegerich | ............. | G02B 6/426 |

OTHER PUBLICATIONS

Dwayne Crawford, https://www.belden.com/blog/data-centers/upc-or-apc, Aug. 14, 2014 (Year: 2014).*

* cited by examiner

*Primary Examiner* — Leslie C Pascal

(57) ABSTRACT

The techniques described herein may be used to deploy a digital kiosk, within a fiber optic network, in a manner that is efficient and that minimizes the risk of damaging the kiosk during the installation process. This may include manufacturing the kiosk with a Fiber Distributed Panel (FDP) that functions as an interface between a fiber optic stub (that connects the kiosk to a fiber optic network backbone) and individual, internal components of the kiosk. A technician therefore may install the kiosk without having to physically open the kiosk and/or configure the fiber cabling and internal components inside the kiosk.

21 Claims, 8 Drawing Sheets

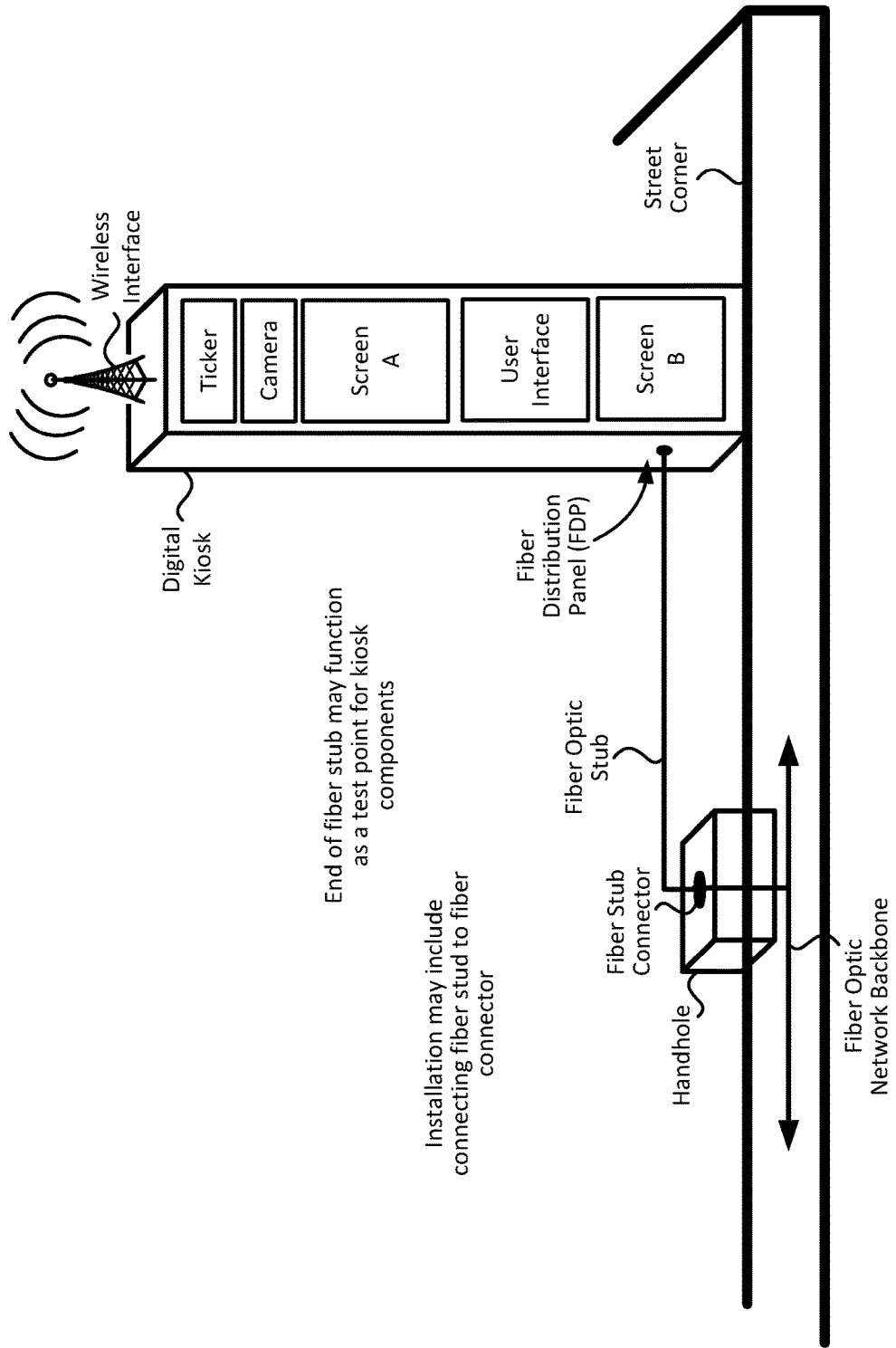

SYSTEM AND METHOD FOR PLUG AND PLAY FIBER DISTRIBUTION PANELS

BACKGROUND

A fiber optic network may include electronic kiosks positioned at different geographic locations throughout the network. The electronic kiosks may provide multimedia and network connectivity services to nearby users. Examples of such services may include displaying videos, playing audio messages, and providing Wi-Fi connectivity, cellular connectivity, and more.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

FIGS. 1A-1B illustrate an example overview of an embodiment described herein;

DETAILED DESCRIPTION OF PREFERRED EMBODIMENTS

Figure 1B:
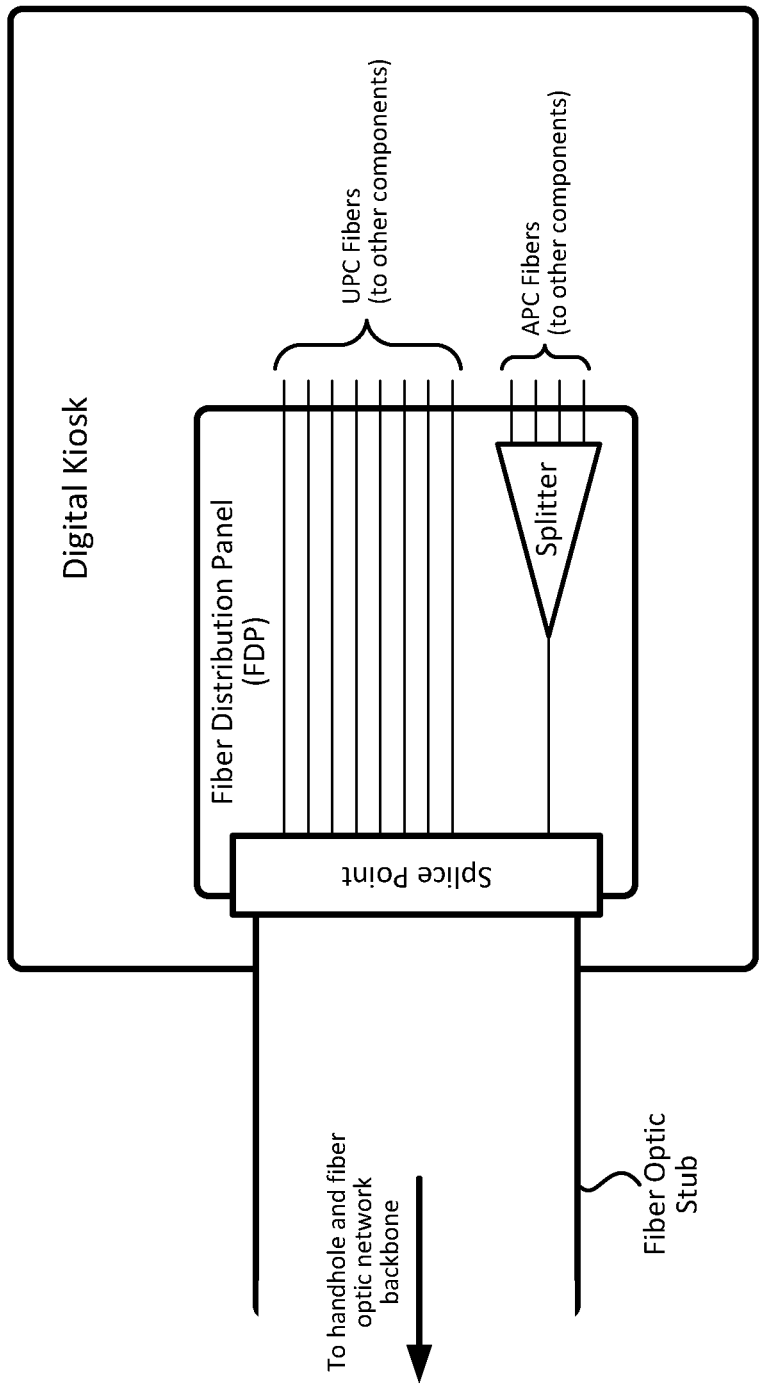

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the appended claims and their equivalents.

A fiber optic network may include information centers, such as electronic kiosks, smart bus shelters, smart signage, etc. that are positioned at different geographic locations throughout the network. An electronic kiosk, for example, may provide multimedia and network connectivity services to nearby users. Examples of such services may include displaying videos, playing audio messages, providing device charging services, and providing Wi-Fi connectivity, cellular connectivity, voice connectivity, emergency services, and more. Before an electronic kiosk may provide such services, the kiosk must be connected to a network, for example, a fiber optic network.

Installing an electronic information center, such as an electronic kiosk, may involve positioning the kiosk at a public and/or outdoor location designated for the kiosk, connecting the internal components with proper cabling, testing the cabling and components to ensure that they operate properly, and physically connecting the kiosk to the fiber optic network. For example, after a kiosk is placed in the designated location, a technician may physically open the kiosk to gain access to the internal components of the kiosk, such as circuit boards, connection ports, power sources, monitors, antenna arrays, processors, memory devices, an internal router, various adapters, etc. The technician may interconnect some of the internal components using fiber cable assemblies, patch cords, splitters, etc., so that the kiosk operates as intended.

The technician may then run one or more tests to ensure that, for example, the new fiber cabling and internal components are operating properly and address problems identified by the tests. This may lead to the sensitive, internal components, and/or the cables interconnecting the components, being damaged and/or disrupted by exposing them to external environmental conditions (e.g., wind, rain, ice, snow, etc.) and/or errors on the part of the technician (e.g., inadvertently disconnecting cables, damaging the fiber distribution panel and other components, etc.). Once the kiosk is configured properly, the kiosk may be physically connected to a fiber optic network backbone.

The techniques described herein may be used with digital kiosks in a manner that is both efficient and that minimizes the risk of damaging the kiosk or the cabling during installation. This may be achieved by using with or incorporating into, kiosks with a Fiber Distributed Panel (FDP) that functions as an interface between a fiber optic stub (that connects the kiosk to the fiber optic network back bone) and the individual fibers used to interconnect the internal components. A technician may install the kiosk without having to physically open the kiosk and/or configure the fiber cabling and internal components inside the kiosk. Instead, the technician may install the kiosk by performing tests (to ensure that the kiosk is operating properly) using the fiber optic stub and then by physically connecting the fiber optic stub to the fiber optic network backbone.

FIGS. 1A-1B illustrate an example overview of an embodiment described herein. As shown, a digital kiosk may be located in a public environment, such as the corner of a public street, a stadium, a train station, a park, etc. The kiosk may include a variety of different components for interacting with users and user devices (e.g., smartphones, laptop computers, etc.), such as a wireless interface, ticker, camera, screen (e.g., Screen A and Screen B), user interface, etc. The wireless interface may include an antenna array configured to communicate wirelessly with user devices (e.g., via Bluetooth©, Wi-Fi, a cellular technology, etc.). The ticker may include a scrolling graphical interface that conveys news headlines, stock market information, weather information, etc. The camera may capture videos and/or images of people, places, things, and events that occur near the digital kiosk. The screens may display videos and/or images that include advertisements, television shows, movies, etc. The user interface may include a touch-sensitive screen, a keyboard, a mouse pointer, microphone and speaker combination, and/or other types of devices that enable people to interact with the digital kiosk by providing and receiving information.

The digital kiosk may include a fiber optic stub that connects the digital kiosk to a fiber optic network backbone via fiber optic stub at a handhole, manhole, etc. The fiber optic network backbone may provide the digital kiosk with access to a service provider network, the Internet, etc. This connectivity may better enable the kiosk to provide the services that it is intended to provide (e.g., relay advertisements, stream videos, playback music, provide geographic information and directions, provide network connectivity to nearby user devices, etc.).

Referring to FIG. 1B, the FDP of the digital kiosk may include a splice point that may function to receive the fiber optic stub and splice the individual fibers of the fiber optic stub to provide connectors for some of the components of the digital kiosk. As shown, some of the individual fibers may be Ultra Physical Contact (UPC) connectors while others may be Angled Physical Contact (APC) connectors. Providing different types of connectors may better enable the digital kiosk to provide effective fiber optic connectivity for the components and services provided by the digital kiosk. For example, Standard Connector Angled Physical Contact (SC-APC) connectors may be used for Passive Optical Network (PON) services, such as connectivity to the Internet, and Local Connector Ultra Physical Contact (LC-UPC) connectors may be used for non-PON services, such as small cell connectivity services. Additionally, to better utilize the capacity (and individual configuration (e.g., UPC versus APC)) of the fibers from the fiber optic stub, the FDP may include a splitter to split a single fiber of the fiber optic stub into multiple APC fibers. As such, the allocation of individual fibers, from the fiber optic stub, to internal components of the digital kiosk may be completely addressed and resolved at the time of manufacture (i.e., well before a technician installs and deploys the digital kiosk). Therefore, as described in further detail below, the techniques describe herein may be used to provide a standardized approach to distributing fiber optical cabling within a digital kiosk that: 1) can be implemented at the time of manufacture; 2) eliminate a need for technicians to modify and/or customize the internal fiber cables and components of the digital kiosk; 3) greatly simply the process of installing a digital kiosk; and 4) all while minimizing the risk of adverse environmental conditions and/or technician error damaging (or otherwise frustrating) the installation and effective operation of digital kiosks.

Figure 2:
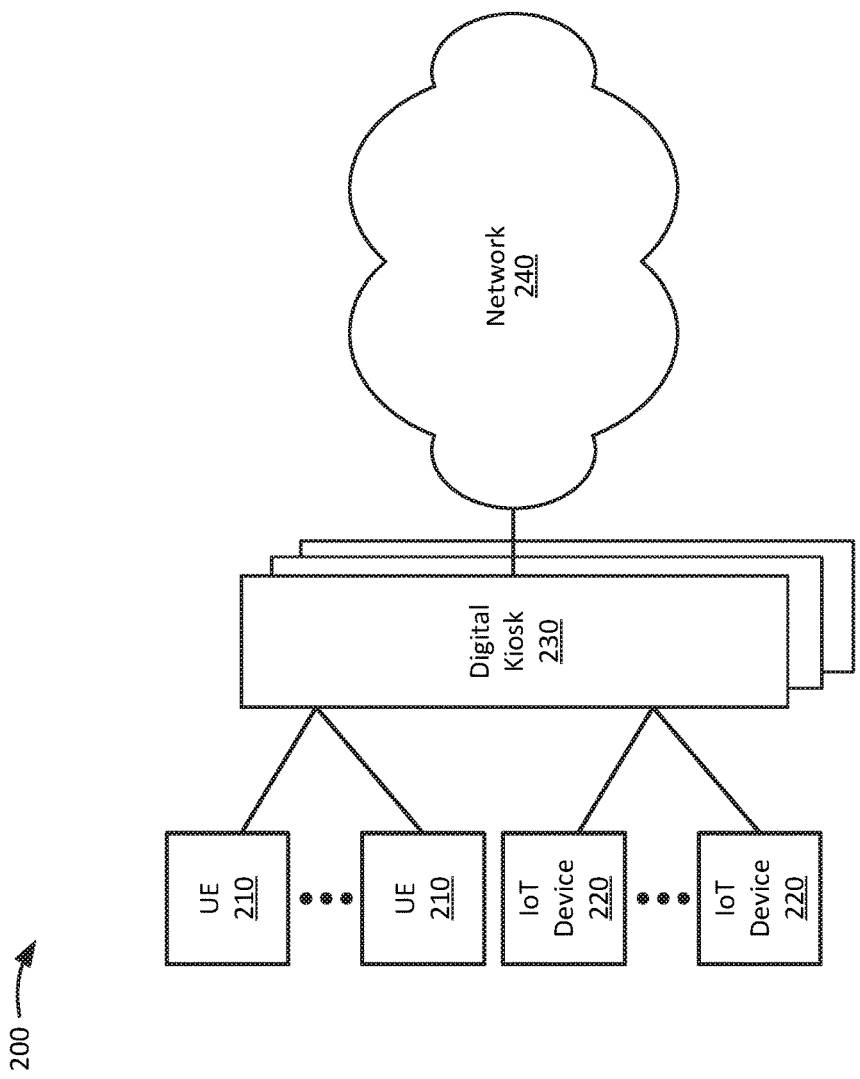
FIG. 2 illustrates an example environment in which systems and/or methods described herein may be implemented.

FIG. 2 is a diagram of an example environment 200 in which systems and/or methods described herein may be implemented. Environment 200 may include UE 210 (referred to herein individually as "UE 210" or collectively as "UEs 210"), IoT devices 220 (referred to herein individually as "IoT device 220" or collectively as "IoT devices 220"), digital kiosks 230 (referred to herein individually as "digital kiosk 230" or collectively as "digital kiosks 230"), and network 240.

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another device of environment 200. Additionally, the devices of environment 200 may interconnect with each other, and/or other devices, via wired connections, wireless connections, or a combination of wired and wireless connections. In some embodiments, one or more devices of environment 200 may be physically integrated in, and/or may be physically attached to, one or more other devices of environment 200. Also, while "direct" connections are shown in FIG. 2 between certain devices, some devices may communicate with each other via one or more additional devices and/or networks.

UE 210 may include a portable computing and communication device, such as a personal digital assistant (PDA), a smart phone, a cellular phone, a laptop computer with connectivity to network 240. UE 210 may connect to network 240 via an access network, which may include digital kiosk 230 or another type of Access Point (AP) (e.g., a Wi-Fi router, a base station, a small cell device, etc.). UE 210 may also, or alternatively, connect to network 240 via an Internet modem. UE 210 may also include a non-portable computing device, such as a desktop computer, a consumer or business appliance, or another device that can connect to an access network of the wireless telecommunications network. UE 210 may also include a computing and communication device that may be worn by a user (also referred to as a wearable device) such as a watch, a fitness band, a necklace, glasses, an eyeglass, a ring, a belt, a headset, or another type of wearable device.

IoT device 220 may include a wireless computing and communication device capable of communicating with the wireless telecommunication network via an access network, which may include digital kiosk 230 or another type of Access Point (AP) (e.g., a Wi-Fi router, a base station, a small cell device, etc.). Examples of IoT device 220 may include a device within a tracking device (e.g., pet tracking devices), vehicle communication devices, environment condition (e.g., precipitation, seismic activity, temperature, etc.) monitoring devices, medical implant devices (e.g., heart monitors, blood pressure monitors, etc.), home automation devices (e.g., to home lighting, heating, and security systems), vending machines, utility meters, parking meters, and more. IoT device 220 may include a machine-to-machine (M2M) device, a machine-type-communication (MTC) device, or another type of device that communicates with a wireless telecommunication network in a similar manner. In some embodiments, while UE 210 is described above as more of a broadband type wireless device, it is possible that in some embodiments, IoT device 220 may be a type of UE 210.

Digital kiosk 230 may include one or more computing devices, such as a server device or a collection of server devices, capable of communicating with other devices (e.g., user device 210, IoT device 220, and one or more devices of network 240). For example, digital kiosk 230 may include one or more wireless interfaces for communicating with UEs 210 and/or IoT devices 220. The wireless interface may communicate by implementing one or more wireless technologies, such as Bluetooth©, Wi-Fi, cellular technology (e.g., Long-Term Evolution (LTE) technology), etc.

Digital kiosk 230 may also include a variety of interfaces for sending and/or receiving information to users and other individuals near digital kiosk 230. For example, digital kiosk 230 may include a ticker configured to display a scrolling graphical information to viewers; multi-purpose screens that may display videos and/or images of advertisements, television shows, movies, etc., to viewers; and user interface devices (e.g., a touch-sensitive screen, a keyboard, a mouse pointer, microphone and speaker combination, etc.) to send and/or receive information from users. Digital kiosk 230 may also include various sensors, such as cameras, microphones, thermometers, seismic sensors, etc., for capturing environmental conditions and other types of information at or near digital kiosk 230. Additional examples of components, cabling, circuitry, wiring, etc., of digital kiosk 230 is discussed below with reference to FIGS. 3 and 4.

Network 240 may include one or more wired and/or wireless networks. For example, network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 270 may include a local area network (LAN), a wireless LAN (WLAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network with a fiber optic backbone, and/or a combination of these or other types of networks.

Figure 3:
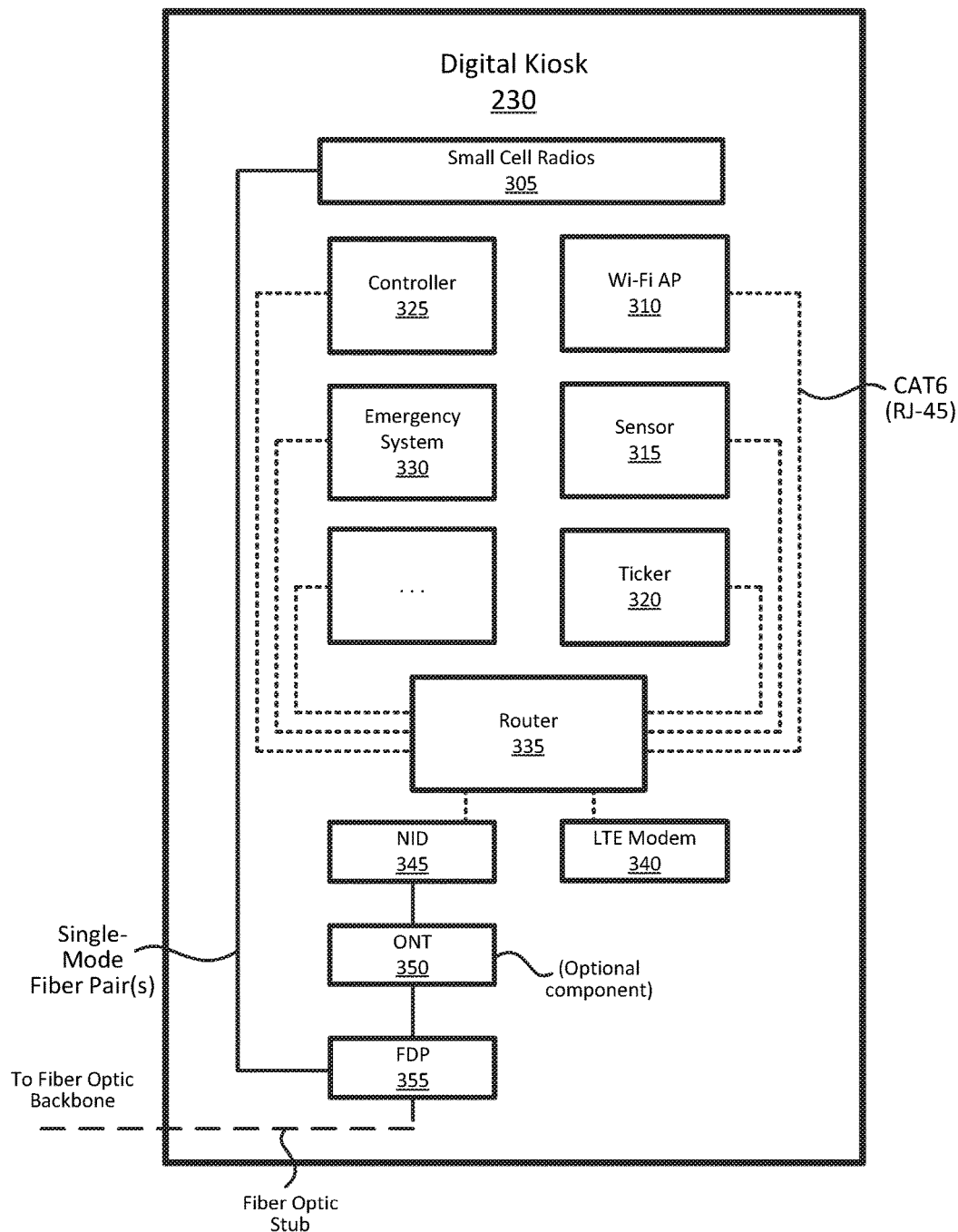
FIG. 3 illustrates examples of components of a digital kiosk.

FIG. 3 illustrates an example of components of digital kiosk 230. As shown in FIG. 3, digital kiosk 230 may include small cell radios 305, Wi-Fi AP 310, sensor 315, ticker 320, controller 325, emergency system 330, router 335, LTE modem 340, Network Interface Device (NID) 345, Optical Network Terminal (ONT) 350, and FDP 355, which may be connected to one another via pairs of single-mode fiber cables, Category 6 (CAT6) cables, and/or another type of suitable cable.

Small cell radios 305 may enable digital kiosk 230 to operate as a small cell device of a wireless telecommunication network. Operating as a small cell device, as described herein, may include operating, or otherwise implementing procedures, consistent with those of a base station of a wireless telecommunication network (e.g., an enhanced Node B (eNB) implementing 3rd Generation Partnership Project (3GPP) Communication Standards) but with coverage area that is smaller than the relatively large coverage area of a typical or traditional base station.

Wi-Fi AP 310 may include processing, radio circuitry, and/or other elements to enable digital kiosk 230 to provide Wi-Fi connectivity to UEs 210 and/or IoT devices 220 within a corresponding coverage area of digital kiosk 230. For example, Wi-Fi AP 310 may enable digital kiosk 230 to operate in a manner that is similar to a Wi-Fi routers, or a similar device, which may include providing broadband network access (e.g., Internet access) to UEs 210 and/or IoT devices 220. In some implementations, digital kiosk 230 may also, or alternatively, implement another type of short-ranged wireless connectivity, such as Bluetooth© connectivity, Device-to-Device (D2D) connectivity, or the like.

Sensor 315 may include processing, radio circuitry, and/or other elements to enable digital kiosk 230 to capture information about a local environment of digital kiosk 230. Examples of sensor 315 may include a camera, microphone, thermometer, precipitation gauge, motion detector, etc., to enable digital kiosk 230 collect information about the surrounding location and/or environment. Ticker 320 may include a display and processing device to display scrolling, graphical information that may convey, to viewers, news headlines, stock market changes, weather information, emergency notices, etc.

Controller 325 may include processing circuitry and/or other elements to manage the overall operations of digital kiosk 230. For example, controller 325 may store (and/or access a computer-readable medium that stores) instructions for managing the resources and operations of digital kiosk 230, such as how to process a request (from UE 210) to establish a telephone call via small cell radios 305, operations to connect UE 210 to an external network, such as the Internet, how to display images and videos to nearby viewers, etc. Emergency system 330 may include processing circuitry and/or other elements for handling emergency calls and requests. For example, emergency system 330 may include, or be connected to, a button or other interface object that a person may press or select in order to contact emergency services, such as law enforcement, fire rescue services, etc. Upon receiving such a request, emergency system 330 may communicate with the other components (e.g., controller 325, router, 335, etc.) of digital kiosk 230 to ensure that the request is processed appropriately.

Router 335 may include processing circuitry and/or other elements of digital kiosk 230 to manage a flow of information between the components of digital kiosk 230. As shown, router 335 may be capable of routing communications among the components of digital kiosk 230 via a particular type of cable, such as a CAT cable (e.g., CAT6), Ethernet cable, etc. LTE modem 340 may include a component of digital kiosk 230 to enable digital kiosk 230 to communicate with UEs 210, IoT devices 220, and/or other digital kiosks 220 via a cellular communication technology, such as the LTE protocol of the 3GPP Communication Standard. In some embodiments, LTE modem 340 may enable digital kiosk 230 to have a large coverage area (similar to that of a traditional or typical eNB). In some embodiments, LTE modem 340 may cooperate with small cell radios 305 to enable digital kiosk 230 to operate as a small cell device that implements the LTE protocol of the 3GPP Communication Standard.

NID 345 include processing circuitry and/or other elements of digital kiosk 230 to enable the digital kiosk 230 to use different types of internal communications (e.g., different types of cabling between different types of components). For instance, NID 345 may receive information, from ONT 350, via a fiber optic cable, and convert the information to a format consistent with communicating the information to other components via Ethernet cables, CAT6 cables, etc. In some embodiments, digital kiosk 230 may not include ONT 350 and NID 345 may be connected directly to FDP 355 via a fiber optic cable. In some embodiments, NID 345 may operate with other types of cable inputs/outputs and under other types of conditions (e.g., Ethernet Line (E-Line) conditions, Ethernet Local Area Network (E-LAN) conditions, etc.).

ONT 350 may include a component of digital kiosk 230 to enable digital kiosk 230 to provide one or more network services to particular users. For example, ONT 350 may enable a user to access Internet, telephone, and/or television services from a service provider corresponding to digital kiosk 230. For instance, when a subscriber of a service provider connects to digital kiosk 230, ONT 350 may operate to enable the subscriber to access a suite of network services corresponding to the subscriber. Additionally, or alternatively, ONT 350 may enable digital kiosk 230 to provide one or more network services, which may include network connectivity and browsing (e.g., Internet access), telephone calling, video calling, text messaging, television broadcast services, etc. FDP 355 may include a component of digital kiosk 230 that provides a functional interface between the fiber optic stub of digital kiosk 230 and the components/functionalities of digital kiosk 230. As shown, FDP 355 may be connected to ONT 350 and/or small cell radios 305 via one or more fiber optic cables (e.g., single-mode fiber optic pairs). In some embodiments, digital kiosk 230 may not include ONT 350 and FDP 355 may be directly connected to NID 345 via fiber optic cabling. Additional details regarding features and functions of FDP 355 are discussed below.

The quantity of components and/or cables, illustrated in FIG. 3, is provided for explanatory purposes only. In practice, digital kiosk 230 may include additional components and/or cables; fewer components and/or cables; different components and/or cables; or differently arranged components and/or cables than illustrated in FIG. 3. For example, in some embodiments, digital kiosk 230 may not include ONT 350. In such an embodiment, FDP 355 may connect directly to NID 345 via fiber optic cabling. In some embodiments, FDP 355 may also, or alternatively, be connected to router 335 via fiber optic cabling. In such embodiments, digital kiosk 230 may not include ONT 350 and/or NID 345. For example, digital kiosk 230 may not include ONT 350 or NID 345, and FDP 355 may be directly connected to router 335 via fiber optic cabling. A direct, fiber optic connection between FDP 355 and router 335 may help increase security control within digital kiosk 230 by simplifying (e.g., via reducing the number of components of that communicate via CAT6 (e.g., Ethernet) cabling and protocols) digital kiosk 230.

Figure 4:
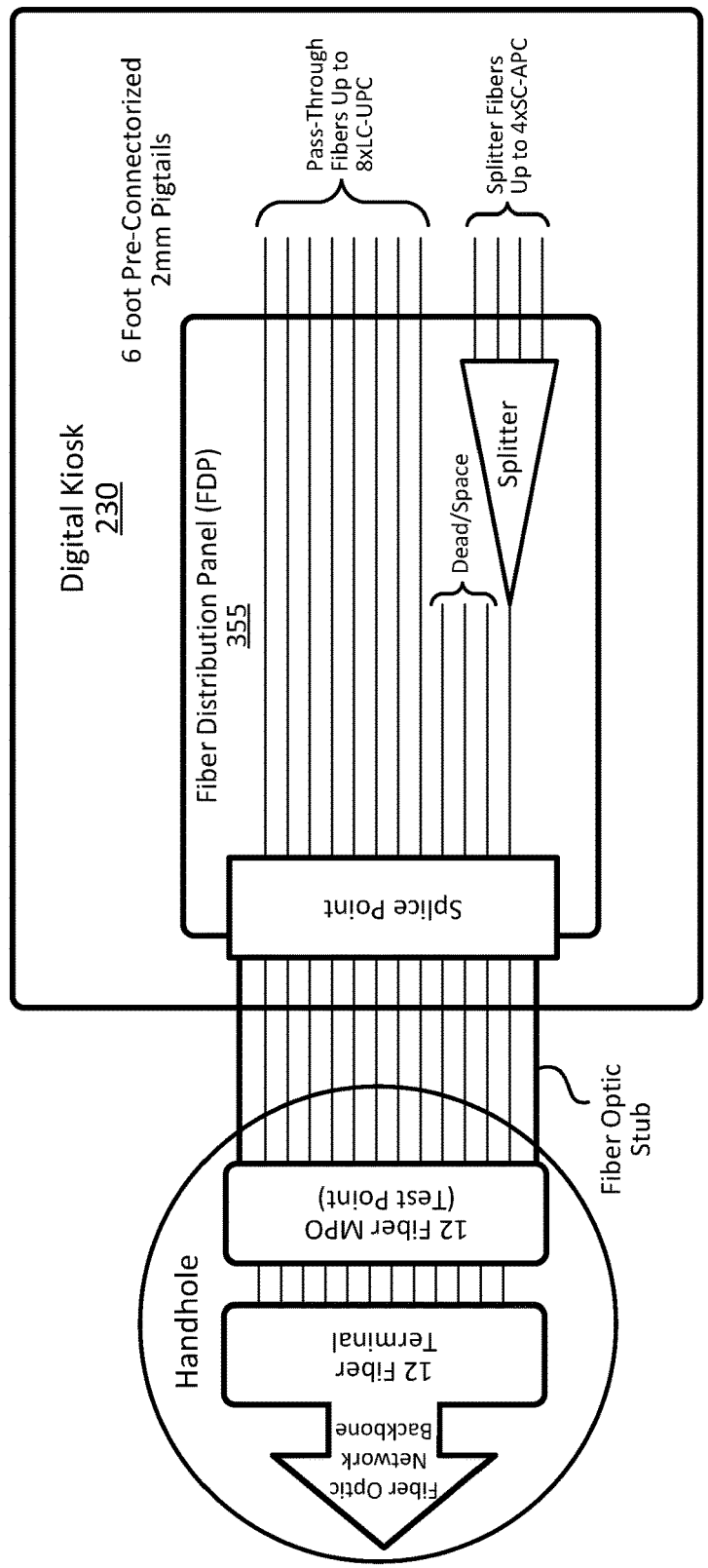
FIG. 4 illustrates an example of a Fiber Distributed Panel (FDP)

FIG. 4 illustrates an example of FDP 355 of digital kiosk 230. As shown, FDP 355 may include a splice point, a splitter, UPC fibers, dead (or open space) fibers, and/or APC fibers. The example of FIG. 4 may pertain to a scenario in which a fiber optic stub includes 12 individual fibers. Additionally, the example of FIG. 4 is provided as a non-limiting example of some of the techniques described herein. In practice, the techniques described herein may pertain to FDPs and/or fiber optic stubs that include one or more additional, fewer, and/or alternative features.

As shown, the 12-fiber optic stub of digital kiosk 230 may include a 12 fiber Multi-Fiber Push On feature that may enable the fiber optic stud to connect to a 12 fiber terminal (of the handhole) in a plug-and-play fashion, such that after digital kiosk 230 has been physically connected to a fiber optic network backbone (via a suitable handhole or the like) digital kiosk 230 may not require any further or additional configurations/modification to being operating at the full, intended potential of digital kiosk 230.

Additionally, the 12-fiber optic stub of digital kiosk 230 may be connected to a splice point of FDP 355. The splice point may splice the individual fibers of the fiber optic stub as shown in FIG. 4. For instance, 6 fibers, of the 12-fiber optic stub, may be allocated as UPC fibers. For instance, the 6 fibers may be allocated as pass-through LC-UPC fibers that may connect FDP 355 to ONT 350, NID 345, and/or router 335. In some embodiments, 8 fibers may be allocated as LC-UPC fibers. By contrast, 1 fiber of the 12-fiber optic stub, may be allocated as SC-APC fibers, by virtue of a splitter positioned within FDP 355. The SC-APC fibers may include pre-connectorized pigtails that may connect FDP 355 to small cell radios 305. As shown in FIG. 4, one or more of the remaining fibers of the fiber optic stub may be dead/space fibers that are not connected or allocated to a particular component/purpose. In some embodiments, the fibers of FDP 355 may include and/or be arranged in one or more additional and/or alternative ways. Additionally, or alternatively, the fibers of FDP 355 may connect FDP 355 to one or more additional and/or alternative components.

Figure 5:
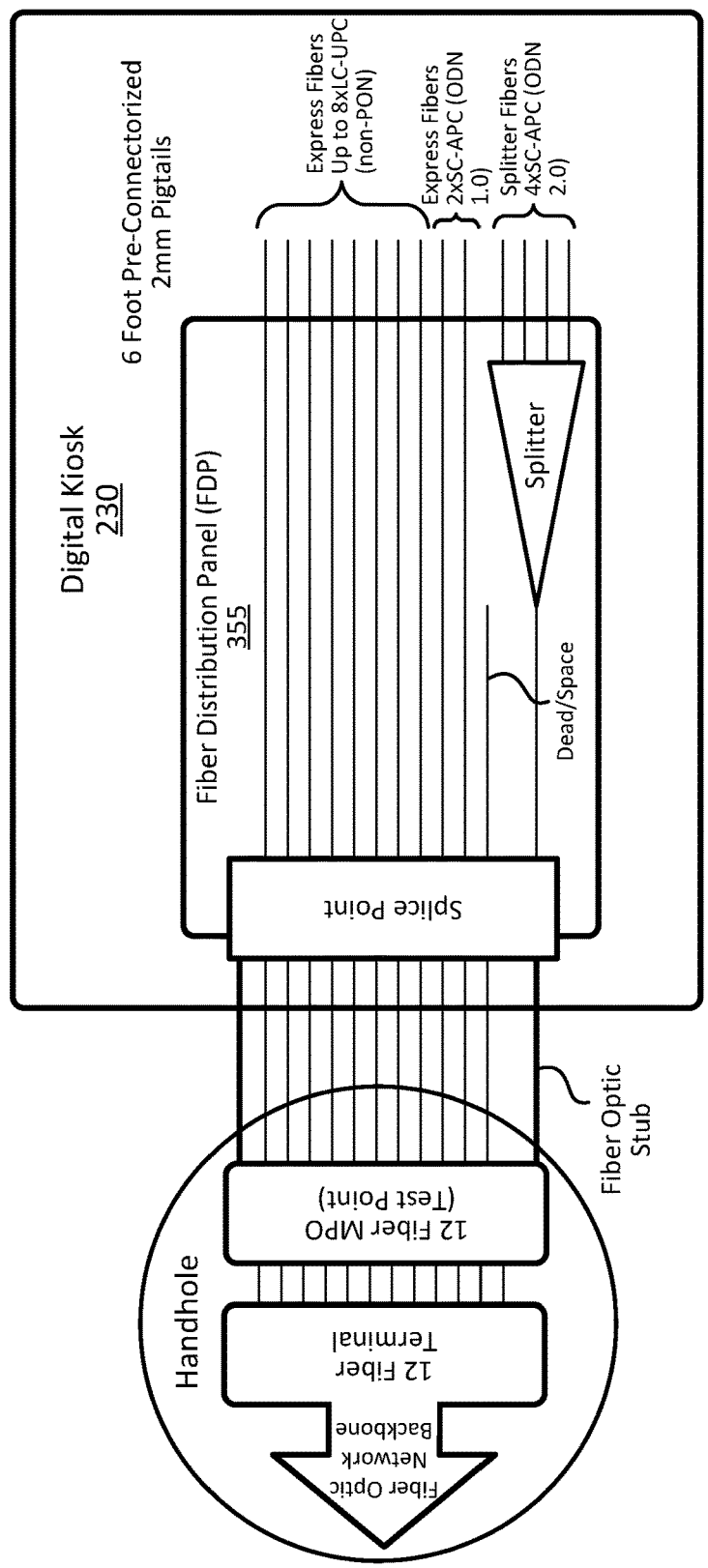
FIG. 5 illustrates another example of a FDP.

FIG. 5 illustrates another example of a FDP. The example of FIG. 5 includes some of the features described above with reference to FIG. 4. For instance, as shown, FDP 220 may include a splice point, splitter, UPC fibers, dead (or open space) fibers, and/or APC fibers. A difference between the example of FIG. 4 and the example of FIG. 5 may include one or more (e.g., two) of the dead/space fibers of FIG. 4 being configured/implemented as express fibers (e.g., SC-APC fibers, Optical Distribution Network (ODN) fibers, etc.). The express SC-APC connectors may include ODN 1.0 PON (1×16 splitter, 1×32 splitter, etc., in field FDH). The express fibers may be pass-through fibers with SC-APC connectors leading to one or more Optical Network Terminals (ONTs) of an ODN that interconnects one or more of the internal components of digital kiosk 230.

As shown, one or more other fibers of the fiber optical stub may be a dead/space fiber, which may enable FDP 355 to provide for additional and/or alternative fiber optic configurations than those explicitly described herein. For instance, some of the SC-APC fibers may be configured for, or otherwise connected to, ODN 1.0 components and other SC-APC fibers may be configured for, or otherwise connected to, ODN 2.0 components. In the example of FIG. 5, the express SC-APC fibers may include connectors that are configured to attach, and relay digital information to/from ODN 1.0 components of digital kiosk 230. By contrast, the splitter fibers may be configured to attach, and relay digital information to/from, to different components of digital kiosk 230 (e.g., ODN 2.0 components). In some embodiments, the fibers of FDP 355 may include and/or be arranged in one or more additional and/or alternative ways. Additionally, or alternatively, the fibers of FDP 355 may connect FDP 355 to one or more additional and/or alternative components.

Figure 6:
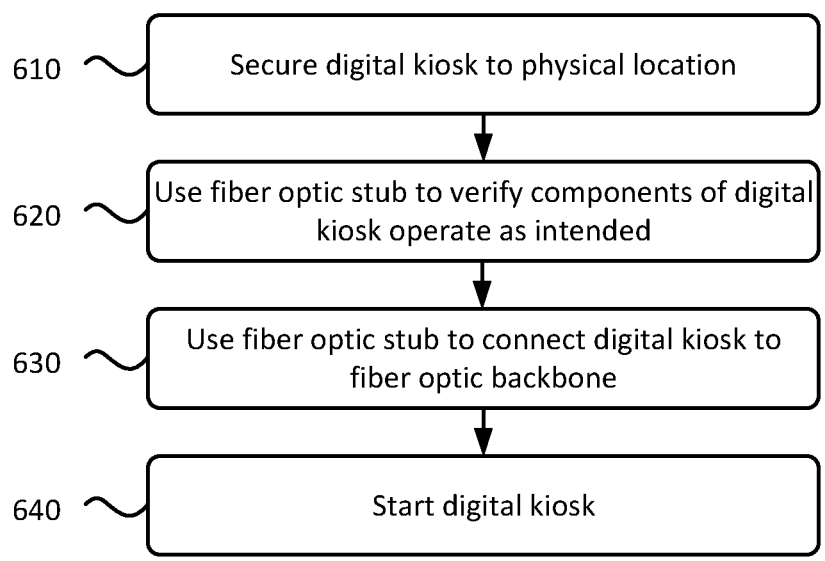
FIG. 6 illustrates an example process for installing a digital kiosk with a FDP.

FIG. 6 is a diagram of an example process 600 for deploying a digital kiosk. As shown, process 600 may include securing digital kiosk 230 to a physical location (block 610). For example, a technician may identify a physical location (e.g., a street corner) where digital kiosk 230 is to be installed and secure digital kiosk 230 to the physical location. This may help ensure that digital kiosk 230 may not be removed from the physical location by an unauthorized party and/or as a result of environmental conditions (e.g., wind, rain, etc.). Additionally, and/or alternatively, a digital kiosk may be installed at a location temporarily, such as at a special event venue, a stadium or a mall for a limited period of time.

Process 600 may also include using the fiber optic stub of digital kiosk 230 to verify that the components of digital kiosk 230 are operating as intended (block 620). For instance, since kiosk 230 may include FDP 255, the technician may test the optical fiber components of digital kiosk 230 via the unconnected end of the fiber optic stub. As a result, the technician may not be required to open digital kiosk 230 and access the internal componentry of digital kiosk 230. Examples of the test performed by the technician may be to ensure that the internal fiber optic cabling is setup correctly and that one or more of the internal components are operating properly. As such, one or more electronic testing devices may be connected to the unconnected end of the fiber optic stub in order perform the tests.

Process 600 may include using the fiber optic stub to connect digital kiosk 230 to a fiber optic backbone (block 630). For example, the fiber optic stub may be connected to fiber stub connector of a handhole, a street post (e.g., a traffic light, a street lamp, etc.), a manhole, etc. The fiber optic stub connector may lead to the fiber optic cabling of a fiber optic backbone. As such, digital kiosk 630 may be connected to a fiber optic network that is owned and operated by a service provider. Process 600 may also include starting digital kiosk 230 (640). This may include the technician connecting digital kiosk 230 to a power source (e.g., plugging digital kiosk 230 into a power outlet) and selecting a power button to initiate a startup process for digital kiosk 230.

Figure 7:
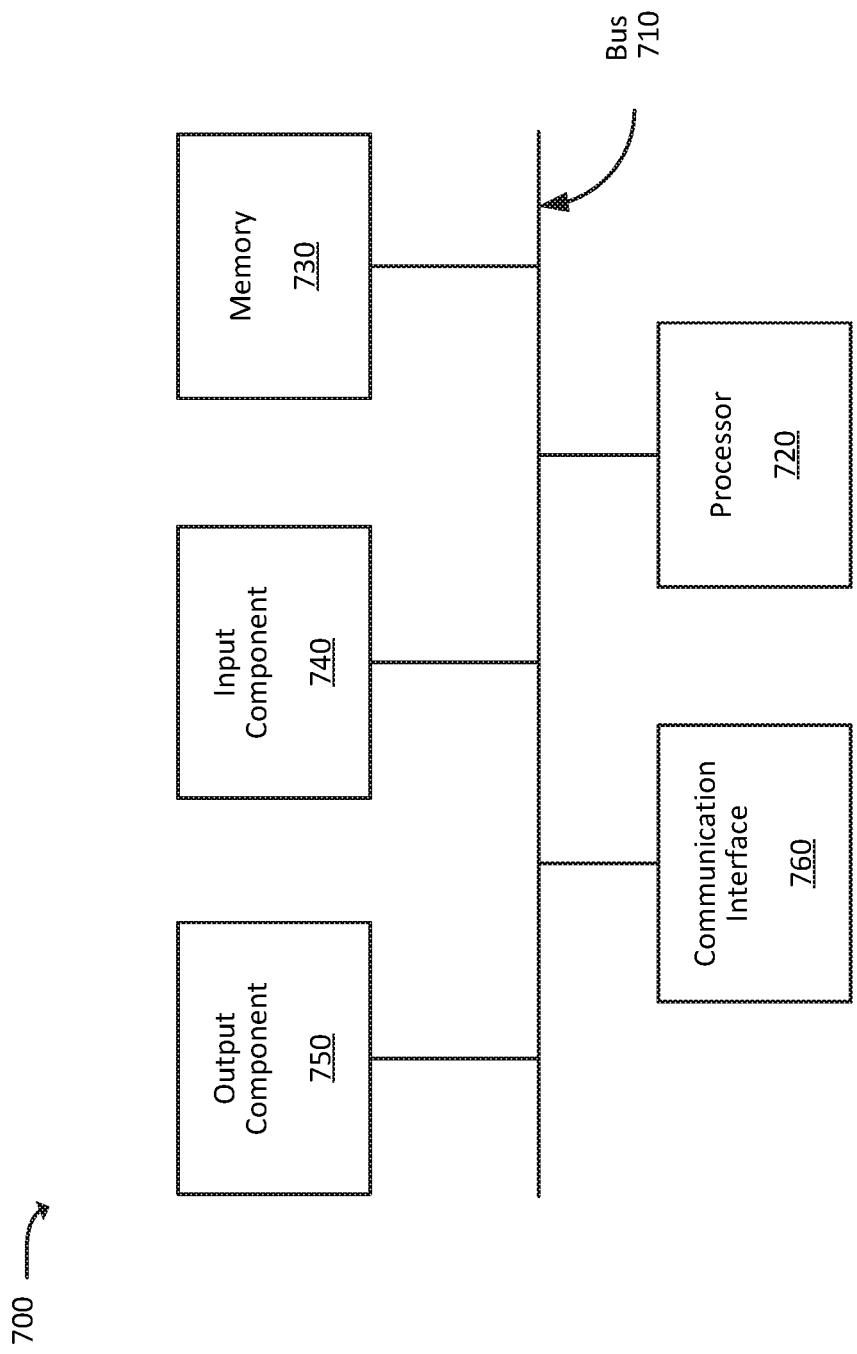
FIG. 7 is a block diagram of example components of a device.

FIG. 7 is a diagram of example components of a device 700. Each of the devices illustrated in FIGS. 1A-5 may include one or more devices 700. Device 700 may include bus 710, processor 720, memory 730, input component 740, output component 750, and communication interface 760. In another embodiment, device 700 may include additional, fewer, different, or differently arranged components. As described herein, a component may be implemented by hardware circuitry, software logic, and/or some combination thereof.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes (LEDs), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared (IR) receiver, a cellular radio, a Bluetooth© radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, embodiments described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope set forth in the claims that follow. The specification and drawings are accordingly to be regarded in an illustrative rather than restrictive sense.

For example, while a series of lines, arrows, and/or blocks have been described regarding FIG. 6 the order of the blocks and arrangement of the lines and/or arrows may be modified in other embodiments. Further, non-dependent blocks may be performed in parallel. Similarly, while series of communications have been described with regard to several of the Figures provided herein, the order or nature of the communications may potentially be modified in other embodiments.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operations and behaviors of the aspects that were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection" of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A digital kiosk, comprising:
a small cell radio configured to provide cellular network connectivity to User Equipment (UE) devices of a wireless telecommunication network;
an Ethernet network that includes a Wi-Fi access point configured to provide Wi-Fi connectivity to the UE devices;
a fiber distribution panel (FDP) configured to:

receive a fiber optic stub that includes a plurality of optical fibers,
arrange a first portion of the plurality of optical fibers as a plurality of pass-through fibers,
split a second portion of the plurality of optical fibers into a plurality of splitter fibers,
connect, via the plurality of splitter fibers, to the small cell radio, and
connect, via the plurality of pass-through fibers, to the Ethernet network;
a Network Interface Device (NID) configured to facilitate the connection between the Ethernet network and the FDP; and
a controller configured to:
use the plurality of splitter fibers to communicate with the UE devices via the small cell radio, and
use the plurality of pass-through fibers to communicate with the UE devices via the Wi-Fi access point.

2. The digital kiosk of claim 1, wherein the plurality of pass-through fibers include Local Connector Ultra Physical Contact (LC-UPC) connectors.

3. The digital kiosk of claim 1, wherein the plurality of splitter fibers include Standard Connector Angled Physical Contact (SC-APC) connectors.

4. The digital kiosk of claim 1, wherein the FDP is further configured to:
arrange another portion of optical fibers, of the plurality of optical fibers, as dead fibers.

5. The digital kiosk of claim 1, wherein the FDP is further configured to:
arrange other optical fibers, of the plurality of optical fibers, as Express Fibers.

6. The digital kiosk of claim 1, wherein the FDP includes a splitter, wherein splitting the plurality of splitter fibers includes using the splitter of the FDP.

7. The digital kiosk of claim 1, wherein the fiber optic stub includes at least a 12-fiber optical cable.

8. The digital kiosk of claim 1, wherein the FDP is connected to the Ethernet network via an Optical Network Terminal (ONT) and the NID of the digital kiosk.

9. The digital kiosk of claim 1, further comprising:
an emergency system that is connected to the Ethernet network and configured to enable an individual to make an emergency communication from the digital kiosk.

10. The digital kiosk of claim 1, wherein the fiber optic stub is configured to connect to a fiber stub connector of a fiber optic network backbone.

11. The digital kiosk of claim 1, further comprising:
a camera configured to capture optical information near the digital kiosk;
a display configured to display visual information; and
a user interface configured to enable a user to provide information to the kiosk,
wherein the controller is further configured to provide network and multi-media services to users via the small cell radio, the Wi-Fi access point, the camera, the display, and the user interface.

12. A digital kiosk, comprising:
a small cell radio configured to provide cellular network connectivity to User Equipment (UE) devices of a wireless telecommunication network;
a fiber distribution panel (FDP) configured to:
receive a fiber optic stub that includes a plurality of optical fibers configured to connect the digital kiosk to a fiber optic network backbone,
arrange a first portion, of the plurality of optical fibers, as pass-through fibers, and
split a second portion, of the plurality of optical fibers, into splitter fibers, and
connect one or more of the splitter fibers to the small cell radio,
an Optical Network Terminal (ONT) configured to:
receive, from the FDP, the pass-through fibers, and
connect the pass-through fibers to a Network Interface Device (NID) configured to provide an interface between components of the digital kiosk and an Ethernet network inside the digital kiosk, the Ethernet network including:
a Wi-Fi access point configured to provide Wi-Fi connectivity to the UE devices, and
a controller that includes:
a non-transitory memory device storing a plurality of processor-executable instructions, and
a processor configured to execute the processor-executable instructions, to:
provide network and multi-media services to the UE devices via the small cell radio and the wi-fi access point.

13. The digital kiosk of claim 12, wherein the pass-through fibers include Local Connector Ultra Physical Contact (LC-UPC) connectors.

14. The digital kiosk of claim 12, wherein the splitter fibers include Standard Connector Angled Physical Contact (SC-APC) connectors.

15. The digital kiosk of claim 12, wherein the FDP is further configured to:
arrange another portion of the optical fibers, of the plurality of optical fibers, as dead fibers.

16. The digital kiosk of claim 12, wherein the FDP is further configured to:
arrange other optical fibers, of the plurality of optical fibers, as Express Fibers.

17. The digital kiosk of claim 12, wherein the Ethernet network further includes:
an emergency system configured to enable an individual to make an emergency call from the digital kiosk.

18. The digital kiosk of claim 12, wherein the Ethernet network further includes:
a camera configured to capture optical information near the digital kiosk;
a display configured to display visual information; and
a user interface configured to enable a user to provide information to the kiosk.

19. A method, comprising:
receiving, by a Fiber Distribution Panel (FDP) of a digital kiosk device, a fiber optic stub that includes a plurality of optical fibers,
arranging, by the FDP, a first portion of the plurality of optical fibers as a plurality of pass-through fibers,
splitting, by the FDP, a second portion of the plurality of optical fibers into a plurality of splitter fibers,
connecting, via the plurality of splitter fibers, to a small cell radio of the digital kiosk device, wherein the small cell radio is configured to provide cellular network connectivity to User Equipment (UE) devices of a wireless telecommunication network;
connecting, via a Network Interface Device (NID) of the digital kiosk device, the plurality of pass-through fibers to an Ethernet network of the digital kiosk device, wherein the Ethernet network includes a Wi-Fi access point configured to provide Wi-Fi connectivity to the UE devices;

using, by a controller of the digital kiosk device, the plurality of splitter fibers to communicate with the UE devices via the small cell radio, and using, by the controller, the plurality of pass-through fibers to communicate with the UE devices via the Wi-Fi access point.

20. The method of claim 19, wherein the fiber optic stub includes at least a 12-fiber optical cable.

21. The method of claim 19, wherein splitting the splitter fibers includes splitting the splitter fibers via a splitter of the FDP.

* * * * *